United States Patent [19]

Bauriedel

[11] Patent Number: 4,487,910
[45] Date of Patent: Dec. 11, 1984

[54] PROCESS FOR POLYURETHANE PREPOLYMERS CONTAINING TERMINAL ISOCYANATE GROUPS AND HAVING A REDUCED RESIDUAL MONOMER CONTENT

[75] Inventor: Hans Bauriedel, Duesseldorf, Fed. Rep. of Germany

[73] Assignee: Henkel Kommanditgesellschaft auf Aktien, Duesseldorf, Fed. Rep. of Germany

[21] Appl. No.: 578,733

[22] Filed: Feb. 9, 1984

[30] Foreign Application Priority Data

Feb. 25, 1983 [DE] Fed. Rep. of Germany ....... 3306559

[51] Int. Cl.³ ............................................. C08G 18/10
[52] U.S. Cl. .................................. 528/65; 156/331.4; 528/52; 528/67
[58] Field of Search ........................... 528/65, 52, 67; 156/331.4

[56] References Cited

U.S. PATENT DOCUMENTS

| 3,839,491 | 10/1974 | Gamero et al. | 528/67 |
| 4,038,239 | 7/1977 | Coyner et al. | 528/67 |
| 4,111,865 | 9/1978 | Seefried et al. | 521/137 |
| 4,423,200 | 12/1983 | Ganster et al. | 528/67 |

FOREIGN PATENT DOCUMENTS 2559759 10/1977 Fed. Rep. of Germany .

OTHER PUBLICATIONS (cf. H. G. Elias, Makromolekule, Huthig & Wepf, Basel, 4th Edition 1981) Heidelbert, New York.

*Primary Examiner*—Maurice J. Welsh
*Attorney, Agent, or Firm*—Ernest G. Szoke; Henry E. Millson, Jr.; Mark A. Greenfield

[57] ABSTRACT

Process for the production of polyurethane prepolymers based on monocyclic and dicyclic diisocyanates, in which a prepolymer based on a dicyclic diisocyanate is produced in a prepolymer based on a monocyclic diisocyanate of comparatively lower reactivity. The products obtained by this process contain terminal isocyanate groups and are distinguished by a reduced content of free monomeric diisocyanates.

20 Claims, No Drawings

PROCESS FOR POLYURETHANE PREPOLYMERS CONTAINING TERMINAL ISOCYANATE GROUPS AND HAVING A REDUCED RESIDUAL MONOMER CONTENT

This invention relates to a process for the production of polyurethane prepolymers based on monocyclic and dicyclic diisocyanates. The products obtained by the process of the invention contain terminal isocyanate groups and are distinguished by a reduced content of free monomeric diisocyanates.

BACKGROUND OF THE INVENTION

Polyurethane prepolymers containing terminal isocyanate groups have been known for some time. They can readily be reacted with suitable hardeners—generally polyhydric alcohols—to form high polymers. Polyurethane prepolymers have acquired significance in numerous fields, including for example sealing compounds, lacquers and adhesives.

To obtain polyurethane prepolymers containing terminal isocyanate groups, it is standard practice to react polyhydric alcohols with an excess of diisocyanates. It is generally known in polymer chemistry that, in this reaction, the molecular weight can be at least approximately controlled through the ratio of hydroxyl groups to isocyanate groups. Thus, products of very high molecular weight are formed where the molar ratio is exactly 1:1, whereas, on a statistical average, adducts of 2 molecules of isocyanate with 1 molecule of diol are formed where the molar ratio of OH to NCO is 1:2. On the strength of this knowledge, it is possible for those skilled in this art to custom-make polyurethane prepolymers containing terminal isocyanate groups with average molecular weights varying within wide limits. However, the products formed show a more or less wide molecular weight distribution, as is normally the case with polymers. In particular, a certain amount of the component which is used in excess remains unreacted at the end of the reaction, irrespective of the reaction time. At the same time, the content of unreacted diisocyanates, referred to herein as residual monomers, increases with the excess of this component in the reaction mixture (cf. H. G. Elias, Makromolekule, Hutig & Wepf, Basel, 4th Edition 1981, pages 487 et seq.).

In numerous applications of polyurethane prepolymers, problems are presented by the presence of residual monomers. Thus, volatile diisocyanates, such as tolylene diisocyanate for example, necessitate particular precautionary measures on an industrial hygiene level, even when they are present in the prepolymers in quantities of only 0.5 to 5% by weight. On the other hand, involatile diisocyanates can cause problems through migration in the field of bonding. Problems such as these can arise, for example, in the sealing of bonded film-to-film laminates.

To reduce the residual monomer content, it is possible in the case of volatile diisocyanates to remove these diisocyanates from the prepolymers by thin-layer distillation under reduced pressure and at an elevated temperature in the range of from about 80° to 150° C. However, this process is complicated and occasionally gives unsatisfactory results. In addition, it is confined to volatile diisocyanates. In the case of nonvolatile diisocyanates, such as the dicyclic diisocyanates, distillation has little to offer. Accordingly, products of relatively high molecular weight are generally used; products such as these having a relatively low residual monomer content because of the theoretical relationships explained at the beginning. Since they also have relatively high viscosities, it is standard practice to use the prepolymers in solution in organic aprotic solvents. However, the use of organic solvents is ecologically unfavorable and is no longer acceptable in numerous applications.

DESCRIPTION OF THE INVENTION

An object of the present invention is to provide a process for the production of polyurethane prepolymers containing terminal isocyanate groups and based on monocyclic and dicyclic diisocyanates, in which the products obtained have a reduced residual monomer content despite the fact that the starting molar ratio of OH groups to NCO groups is less than 1.

Accordingly, the present invention relates to a process for the production of polyurethane prepolymers containing terminal isocyanate groups from monocyclic and dicyclic diisocyanates, wherein, in a first step, a monocyclic diisocyanate is reacted with a polyhydric alcohol in an OH:NCO ratio of less than 1 and, in the prepolymer thus formed, a dicyclic diisocyanate is reacted with a polyhydric alcohol in an OH:NCO ratio of less than 1; the reactions optionally being carried out in the presence of the usual catalysts and/or at elevated temperatures.

The invention utilizes the fact that polyurethane prepolymers containing terminal isocyanate groups have a comparatively low viscosity when they are derived from a monocyclic diisocyanate. Accordingly, a prepolymer such as this is produced in a first reaction step in which the starting molar ratio is selected so that the product formed is still liquid, at least at the reaction temperature. In a second reaction step, the reaction of a polyhydric alcohol with a dicyclic diisocyanate is carried out in this liquid prepolymer as "solvent" or reactive diluent. In addition, the process of the invention utilizes the greater reactivity of the isocyanate groups in the dicyclic diisocyanates compared with the isocyanate groups in the prepolymers which are derived from the monocyclic diisocyanates. In this way, the product obtained in the first step (reactive diluent) reacts minimally, if at all, with the polyol component added in the second step. Since, on the one hand, the residual monomer content of the reactive diluent undergoes a further reduction during the second reaction step, especially since the monocyclic diisocyanates present as residual monomers in the reactive diluent contain isocyanate groups of higher reactivity than the reactive diluent itself, and since on the other hand relatively high molecular weight prepolymers having a low content of residual monomers, which would not be processible without reactive diluent, prepolymer mixtures having a greatly reduced residual monomer content are obtained overall. Monocyclic diisocyanates particularly suitable for carrying out the process of the invention are aromatic compounds which contain two isocyanate groups of different reactivity. In this connection, 2,4-tolylene diisocyanate for example is of considerable commercial significance. Aliphatic, cyclic diisocyanates, such as isophorone diisocyanate for example, are also suitable. Among the aliphatic compounds, those containing isocyanate groups of different reactivity are again preferred.

The monocyclic diisocyanates can be reacted with a large number of different polyhydric alcohols. Aliphatic alcohols containing from 2 to 6, preferably from 2 to 4 hydroxyl groups per molecule are suitable for use in this step. Although both primary and secondary alcohols can be used, secondary alcohols are preferred. Preferably, when diols are employed herein they contain from 2 to 5 carbon atoms; for triols, 3 to 6 carbon atoms; and for tetraols, 4 to 8 carbon atoms. It is also possible to use the reaction products of low molecular weight polyhydric alcohols with alkylene oxides containing up to 4 carbon atoms. Suitable reaction products such as these are, for example, the reaction products of ethylene glycol, propylene glycol, the isomeric butane diols or hexane diols, with ethylene oxide, propylene oxide and/or butene oxide. It is also possible to use the reaction products of trifunctional alcohols, such as glycerol, trimethylol ethane and/or trimethylol propane, or higher alcohols, such as pentaerythritol for example, or sugar alcohols with the above-mentioned alkene oxides.

Polyether polyols having a molecular weight of from about 100 to about 5000 are particularly suitable.

Thus, it is possible—depending on the required molecular weight—to use adducts of only a few moles of ethylene oxide and/or propylene oxide per mole, up to more than 100 moles of ethylene oxide and/or propylene oxide, with low molecular weight polyhydric alcohols. Other polyether polyols can be obtained by the condensation of, for example, glycerol or pentaerythritol with the elimination of water. In addition, polyols of the type commonly used in polyurethane chemistry formed by the polymerization of tetrahydrofuran can be employed. Of the polyether polyols mentioned above, the reaction products of polyhydric low molecular weight alcohols with propylene oxide and the conditions under which at least some secondary hydroxyl groups are formed are particularly suitable. Other suitable polyether polyols are described, for example, in German Application No. 25 59 759.

In addition, polyester polyols having a molecular weight of from about 200 to about 10,000 are suitable for reaction with the monocyclic diisocyanates. In a first embodiment, it is possible to use polyester polyols of the type obtained by reacting low molecular weight polyhydric alcohols, particularly ethylene glycol, propylene glycol, glycerol or trimethylol propane, with from about 1 to about 50 moles of caprolactone. Other suitable polyester polyols can be produced by polycondensation. Thus, dihydric and/or trihydric alcohols can be condensed with a sub-equivalent quantity of dicarboxylic acids and/or tricarboxylic acids or reactive derivatives thereof to form polyester polyols. Dicarboxylic acids suitable for this purpose are succinic acid, and its higher homologs containing up to 12 carbon atoms and also unsaturated dicarboxylic acids, such as maleic acid or fumaric acid, and aromatic dicarboxylic acids, particularly the isomeric phthalic acids. Citric acid and trimellitic acid are suitable tricarboxylic acids. Polyester polyols particularly suitable for the purposes of the invention are polyester polyols of the above-mentioned dicarboxylic acids and glycerol which have a residual content of secondary-OH groups.

To obtain reaction products of monocyclic diisocyanates with polyhydric alcohols which may be used as solvent or "reactive diluent" in the second reaction step in accordance with the invention, it is important to maintain a certain ratio between hydroxyl groups and isocyanate groups. Thus, products of sufficiently low viscosity are formed when the number of —OH groups divided by the number of isocyanate groups amounts to between about 0.4 and about 0.8 and preferably to between about 0.5 and about 0.7.

As stated above, to carry out the second step of the process of the invention, dicyclic diisocyanates are reacted with polyhydric alcohols in the prepolymers obtained in the first step. The dicyclic diisocyanates are used in a quantity of from about 5 to about 80% by weight, preferably in a quantity of from about 5 to about 60% by weight and, more preferably, in a quantity of from about 10 to about 40% by weight, based on the total quantity of diisocyanates in steps 1 and 2. In the second reaction step, the molar ratio of hydroxyl groups to isocyanate groups, expressed as the quotient of the —OH groups divided by isocyanate groups, is between about 0.65 and about 0.80 and preferably between about 0.70 and about 0.75.

In selecting the dicyclic diisocyanates, it is important for the reactivity of their isocyanate groups to hydroxyl groups to be higher than that of the terminal isocyanate groups in the reactive diluent. Accordingly, diaryl diisocyanates are particularly suitable. 4,4'-diphenyl methane diisocyanate and/or substituted 4,4'-diphenyl methane diisocyanates are preferred. 4,4'-dicyclohexyl methane diisocyanate, which can be viewed as a hydrogenation product of the former, can be employed although it is somewhat less suitable.

The polyhydric alcohols given above with respect to the first reaction step can also be used for the reaction of the dicyclic diisocyanates. However, it is also possible to use low molecular weight polyhydric alcohols such as, for example, ethylene glycol, propylene glycol, their oligomers, the isomeric butane diols or hexane diols, trifunctional alcohols, such as glycerol, trimethylol ethane or trimethylol propane, and higher alcohols, such as pentaerythritol, and/or sugar alcohols.

To carry out the process of the invention, it is also preferred to react the diisocyanates with the polyhydric alcohols at an elevated temperature. Suitable temperatures are in the range of from about 50° to about 100° C., preferably from about 60° to about 80° C. In one particularly preferred embodiment, the first step is carried out at a temperature of from about 50° to about 90° C. and over a period of from about 2 to about 20 hours. The starting materials for the second reaction step are then added at temperatures of from about 60° to about 80° C., homogenized for 15 minutes and the reaction mixtures subsequently left standing. The reaction is over when there is no further reduction in the number of isocyanate groups. This can be analytically determined by titrating the isocyanate groups and is generally achieved after 2 to 5 days at room temperature.

The products of the present process have a substantially reduced content of free, monomeric, monocyclic and also dicyclic diisocyanates. Thus, in cases where the prepolymers are applied over large areas at elevated temperatures, i.e. in the range of from about 70° to about 120° C., preferably from about 80° to about 100° C., no problems are caused by volatile monocyclic diisocyanates.

The prepolymers according to the invention can be used either as such or in solution in organic solvents for bonding plastics and, more particularly, for laminating plastic films. In this case, standard hardeners, such as polyhydric alcohols of relatively high molecular weight (2-component systems) can be added or surfaces of known moisture content can be directly bonded using the products of the invention. Film-to-film laminates produced using the products of the invention are safe to heat-seal. This may be attributable to the reduced content of migratable low molecular weight products in the prepolymers.

The invention will be illustrated by the following examples, which are not given for purposes of limitation.

EXAMPLES

Example 1

600 g of polypropylene glycol (0.31 mole)—OH number 58, 360 ppm of water) were mixed with 94.06 g of 2,4-tolylene diisocyanate (48.25% NCO, 0.54 mole) in a reaction vessel equipped with a stirrer. The reaction mixture was heated to 65° C. and left at that temperature for 16 hours. A polyurethane prepolymer having a viscosity of 6.0 Pa.s at 23° C. and a residual monomer content of 0.2% (2,4-tolylene diisocyanate) was formed. The prepolymer had an overall NCO content of 2.62%. 171.61 g of 4,4'-diphenyl methane diisocyanate (33.5% NCO, 0.686 mole) were introduced into the prepolymer and melted by heating to 70° C. After the addition of 291.11 g of polytetrahydrofuran (polytetramethylene glycol, OH number 176, 398 ppm of water, 0.456 mole) the mixture was homogeneously stirred at 70° C. and then left standing without heating. After storage for 1 week, the mixed prepolymer formed had a viscosity of 2.50 Pa.s at 75° C. and residual isocyanate monomer contents of 0.01% of 2,4-tolylene diisocyanate (below the detection limit) and 2.4% of 4,4-diphenyl methane diisocyanate. The titratable NCO-content amounted to 3.17%.

Example 2

The procedure of this example was similar to that of Example 1, except that an aliphatic adipic acid polyester was used in the first step (quantity weighed in 500 g, OH number 56, 334 ppm of water). A reactive diluent having a viscosity of 7.85 Pa.s at 75° C. was obtained by reaction at 65° C. with 78.4 g of 2,4-tolylene diisocyanate (0.45 mole). In the second reaction step, 92.54 g of 4,4'-diphenyl methane diisocyanate (0.37 mole) were melted at 70° C. in the reactive diluent thus obtained and the resulting melt reacted for 2 hours at 70° C. with 155.34 g of polytetramethylene glycol (OH number 176, 398 ppm of water, 0.244 mole). The reaction mixture was then left standing for 2 days, after which the following values were determined: % NCO=2.77, % monomeric 2,4-tolylene diisocyanate<0.03, % monomeric 4,4'-diphenyl methane diisocyanate: 1.5, viscosity: 7.15 Pa.s at 90° C.

Example 3

800 g of a prepolymer were produced in the same way as described in Example 1. 93.0 g of 4,4'-diphenyl methane diisocyanate (0.37 mole) and 107.0 g of polypropylene glycol (145 ppm of water, 0.246 mole) were stirred for 2 hours at 70° C. in the prepolymer. The reaction mixture was then left standing at room temperature for 3 days, after which the following analytical values were determined: % monomeric 2,4-tolylene diisocyanate<0.01, monomeric 4,4'-diphenyl methane diisocyanate: 1.3.

Example 4

A polyurethane prepolymer was initially produced as in Example 2 from an aliphatic adipic acid polyester and 2,4-tolylene diisocyanate. 276 g of 4,4'-diphenyl methane diisocyanate (1.103 mole) and 524 g of an adipic acid polyester (aliphatic, OH number 154, 226 ppm of water, 0.72 mol) were then stirred for 2 hours at 70° C. in 1200 g of this polyurethane prepolymer. The reaction mixture was then left standing at room temperature for 2 days, after which the following analytical data were determined: % NCO=2.83, % monomeric 2,4-tolylene diisocyanate: 0.02, % monomeric 4.4'-diphenyl methane diisocyanate: 2.3, viscosity: 9.26 Pa.s at 90° C.

The residual monomer contents were determined by gel chromatography. The percentages are based on the total quantity of prepolymer.

What is claimed is:

1. A process for the preparation of a polyurethane prepolymer containing terminal isocyanate groups from both monocyclic and dicyclic diisocyanates comprising the steps of
   a. reacting a monocyclic diisocyanate with a polyhydric alcohol in an OH:NCO ratio of less than 1 to form a prepolymer; and
   b. reacting a dicyclic diisocyanate with a polyhydric alcohol in an OH:NCO ratio of less than 1, wherein the reaction is carried out in the prepolymer prepared in step a.

2. A process in accordance with claim 1 wherein the monocyclic diisocyanate is tolylene diisocyanate, isophorone diisocyanate, or a mixture of the foregoing.

3. A process in accordance with claim 1 wherein the dicyclic diisocyanate is 4,4'-diphenyl methane diisocyanate, 4,4'-dicyclohexyl methane diisocyanate, or a mixture of the foregoing.

4. A process in accordance with claim 2 wherein the dicyclic diisocyanate is 4,4'-diphenyl methane diisocyanate, 4,4'-dicyclohexyl methane diisocyanate, or a mixture of the foregoing.

5. A process in accordance with claim 1 wherein in step a. the OH:NCO ratio is between about 0.4 and about 0.8.

6. A process in accordance with claim 5 wherein the OH:NCO ratio in step a. is between about 0.5 and about 0.7.

7. A process in accordance with claim 1 wherein in step b. the OH:NCO ratio is between about 0.65 and about 0.80.

8. A process in accordance with claim 7 wherein the OH:NCO ratio in step b. is between about 0.70 and about 0.75.

9. A process in accordance with claim 5 wherein in step b. the OH:NCO ratio is between about 0.65 and about 0.80.

10. A process in accordance with claim 1 wherein the polyhydric alcohols in steps a. and b. are primary or secondary aliphatic alcohols containing from 2 to 6 hydroxyl groups.

11. A process in accordance with claim 10 wherein the alcohols contain from 2 to 4 hydroxyl groups.

12. a process in accordance with claim 10 wherein the alcohols are diols containing from 2 to 5 carbon atoms, triols containing from 3 to 6 carbon atoms, tetraols containing from 4 to 8 carbon atoms, or —OH functional polyesters having molecular weights of from about 200 to about 10,000.

13. A process in accordance with claim 1 wherein the dicyclic diisocyanate employed in step b. is employed in a quantity of from about 5 to about 80% by weight, based on the total quantity of diisocyanates employed in the process.

14. A process in accordance with claim 1 wherein step a. and step b. are each carried out at a temperature in the range of from about 50° C. to about 100° C.

15. A process in accordance with claim 14 wherein said temperature is in the range of from about 60° C. to about 80° C.

16. A process in accordance with claim 10 wherein said alcohols are polyether polyols having a molecular weight of from about 100 to about 5000.

17. A process in accordance with claim 16 wherein the polyether polyols are polyoxyethylene or polyoxypropylene polyols.

18. A polyurethane prepolymer prepared in accordance with the process of claim 1.

19. A method for bonding plastic materials together comprising contacting the plastic materials to be bonded together with the polyurethane prepolymer prepared by the process of claim 1 in the presence of moisture or a hardener composition or both and joining the plastic materials together until bonding is achieved.

20. A method in accordance with claim 19 wherein the bonding is carried out at a temperature in the range of from about 70° to about 120° C.

* * * * *